United States Patent
Narayanan et al.

(10) Patent No.: US 11,481,906 B1
(45) Date of Patent: Oct. 25, 2022

(54) CUSTOM LABELING WORKFLOWS IN AN ACTIVE LEARNING-BASED DATA LABELING SERVICE

(71) Applicant: Amazon Technologies, Inc., Seattle, WA (US)

(72) Inventors: Hareesh Lakshmi Narayanan, Seattle, WA (US); Rahul Sharma, San Jose, CA (US); Arvind Jayasundar, Belmont, CA (US); Vikram Madan, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 37 days.

(21) Appl. No.: 16/370,723

(22) Filed: Mar. 29, 2019

Related U.S. Application Data

(60) Provisional application No. 62/770,882, filed on Nov. 23, 2018.

(51) Int. Cl.
  *G06T 7/187* (2017.01)
  *G06K 9/62* (2022.01)
  *G06N 20/00* (2019.01)
  *G06V 30/414* (2022.01)

(52) U.S. Cl.
  CPC .......... *G06T 7/187* (2017.01); *G06K 9/6259* (2013.01); *G06K 9/6262* (2013.01); *G06N 20/00* (2019.01); *G06V 30/414* (2022.01)

(58) Field of Classification Search
  CPC .......... G06F 16/583; G06F 2221/2107; G06K 9/00362; H04L 67/306; G06Q 30/0201; H04N 7/181; G06N 20/00; G06N 3/0481; G06N 3/08

USPC .......... 382/294, 103; 386/241, 227; 348/143
See application file for complete search history.

(56) References Cited

U.S. PATENT DOCUMENTS

| 7,792,353 | B2 | 9/2010 | Forman et al. |
| 2011/0088011 | A1 | 4/2011 | Ouali |
| 2012/0269436 | A1 | 10/2012 | Mensink et al. |
| 2017/0039038 | A1 | 2/2017 | Huber et al. |

(Continued)

OTHER PUBLICATIONS

Non Final Office Action, U.S. Appl. No. 16/370,706, dated Sep. 1, 2020, 8 pages.

(Continued)

*Primary Examiner* — Kiet M Doan
(74) *Attorney, Agent, or Firm* — Nicholson De Vos Webster & Elliott LLP

(57) ABSTRACT

Techniques for active learning-based data labeling are described. An active learning-based data labeling service enables a user to build and manage large, high accuracy datasets for use in various machine learning systems. Machine learning may be used to automate annotation and management of the datasets, increasing efficiency of labeling tasks and reducing the time required to perform labeling. Embodiments utilize active learning techniques to reduce the amount of a dataset that requires manual labeling. As subsets of the dataset are labeled, this label data is used to train a model which can then identify additional objects in the dataset without manual intervention. The process may continue iteratively until the model converges. This enables a dataset to be labeled without requiring each item in the data set to be individually and manually labeled by human labelers.

20 Claims, 12 Drawing Sheets

(56) References Cited

U.S. PATENT DOCUMENTS

| | | | | |
|---|---|---|---|---|
| 2017/0315979 A1* | 11/2017 | Boucher | ................ | G06F 40/18 |
| 2018/0052891 A1* | 2/2018 | Shuster | ............ | G06F 16/24568 |
| 2019/0028431 A1* | 1/2019 | Keller | .................. | H04L 61/302 |
| 2019/0294881 A1* | 9/2019 | Polak | .................. | G06K 9/4628 |
| 2020/0226431 A1 | 7/2020 | Zeiler et al. | | |
| 2020/0327409 A1* | 10/2020 | Kim | .................... | G06N 3/0454 |
| 2020/0401851 A1 | 12/2020 | Mau et al. | | |

OTHER PUBLICATIONS

Final Office Action, U.S. Appl. No. 16/370,733, dated Aug. 11, 2021, 16 pages.
Non-Final Rejection dated Feb. 4, 2021 for U.S. Appl. No. 16/370,733.
Notice of Allowance, U.S. Appl. No. 16/370,706, dated Mar. 2, 2021, 10 pages.
Advisory Action, U.S. Appl. No. 16/370,733, dated Oct. 13, 2021, 3 pages.
Notice of Allowance, U.S. Appl. No. 16/370,733, dated May 12, 2022, 17 pages.

\* cited by examiner

400 —
```
NAME
┌─────────────────────────────────────────┐
│ CUSTOM JOB                              │
└─────────────────────────────────────────┘
INPUT DATASET LOCATION
┌─────────────────────────────────────────┐
│ INPUT URL                               │
└─────────────────────────────────────────┘
OUTPUT DATASET LOCATION
┌─────────────────────────────────────────┐
│ OUTPUT URL                              │
└─────────────────────────────────────────┘
DATASET ACCESS CONTROL
┌─────────────────────────────────────────┐
│ CREDENTIAL                              │
└─────────────────────────────────────────┘
```

402 —

TASK TYPE

TASK SELECTION

| IMAGE CLASSIFICATION | BOUNDING BOX |
| --- | --- |
| SEMANTIC SEGMENTATION | CUSTOM |

*FIG. 4*

```
700 ┐
    #Request
    {
       "version": "2018-10-16",
       "labelingJobRef": <labelingJobRef>,
       "dataObject" : {
          "source": <string>,
          "source-ref": <string>
       }
    }

702 ┐
    #Response (Expected data from Pre-Annotation customer function)
    {
       "taskInput": <json object>,
       "humanAnnotationRequired":<boolean>
    }
```

```
704 ┐
    #Request Object
    {
       "version": "2018-10-16",
       "labelingJobRef": <labelingJobRef>,
       "labelCategories": [<string>],
       "labelAttributeName": <string>,
       "roleRef" : "string",
       "payload": {
          "Uri": <string>
       }
    }

706 ┐
    #Payload content
    [
       {
          "datasetObjectId": <string>,
          "dataObject": {
          "source": <string>,
          "source-ref": <string>
          },
          "annotations": [{
             "workerId": <string>,
             "annotationData": {
                "content": <string>,
                "Uri": <string>
             }
          }]
       }
    ]

708 ┐
    #Response Object
    [
       {
          "datasetObjectId": <string>,
          "consolidatedAnnotation": {
             "content": {
                "<labelattributename>": {
                }
             }
          }
       }
    ]
```

802 — CreateLabelingJob
Creates and starts a labeling job using specified input/output dataset, modality, annotation task specification, workforce type.

804 — DescribeLabelingJob
Returns LabelingJob status, progress and audit fields. Also returns all parameters that were used for creating the LabelingJob. Can be used to "clone" a job by feeding the returned input fields back into the CreateLabelingJob API.

806 — ListLabelingJobsForWorkTeam
Lists labeling jobs for a specific workteam 808 — ListLabelingJobs
Paginated List API that returns "summary" objects. Very similar to ListTrainingJobs, ListHPOJobs etc.

810 — StopLabelingJob
Stops a LabelingJob. The Job transitions to "Stopping" state, followed by "Stopped" state. Stopped or Stopping jobs cannot be restarted. The job will export the current "state" and a new job can be started that picks up from that state.

*FIG. 8*

CUSTOM LABELING WORKFLOWS IN AN ACTIVE LEARNING-BASED DATA LABELING SERVICE

CROSS-REFERENCE TO RELATED APPLICATIONS

This application claims the benefit of U.S. Provisional Application No. 62/770,882, filed Nov. 23, 2018, which is hereby incorporated by reference.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which:

FIG. 4 illustrates an example user interface for customizing labeling workflows according to some embodiments.

FIG. 7 illustrates example contracts according to some embodiments.

FIG. 8 is a diagram illustrating example application programming interfaces (APIs) for active learning-based data labeling according to some embodiments.

DETAILED DESCRIPTION

Various embodiments of methods, apparatus, systems, and non-transitory computer-readable storage media for active learning-based data labeling are described. According to some embodiments, an active learning-based data labeling service enables a user to build and manage large, high accuracy datasets for use in various machine learning systems. In various embodiments, machine learning may be used to automate annotation and management of the datasets, increasing efficiency of labeling tasks and reducing the time required to perform labeling. In the past, labeling has been performed through the brute force efforts of human labelers who are given a dataset to label and return labels (e.g., a description of objects in the dataset, words spoken, bounding boxes around objects, etc.). Embodiments utilize active learning systems to reduce the amount of a dataset that requires manual labeling. As subsets of the dataset are labeled, this label data is used to train a model which can then identify additional objects in the dataset without manual intervention. The process may continue iteratively until the model converges (e.g., identifies objects above an accuracy threshold). The process can be customized with user-specified preprocessing and postprocessing serverless processes. This allows users to add customized validation, filtering, and other processing steps to the active learning workflow. This enables a dataset to be labeled without requiring each item in the data set (e.g., image, video frame, video file, audio files, audio tokens, etc.) to be individually and manually labeled by human labelers. In various embodiments, users can create custom labeling jobs for use cases that are not natively supported by the active learning system. For example, the user can create a custom labeling job to add hexagonal bounding boxes instead of rectangular bounding boxes, or label just points or lines in an image, or annotate domain specific data, such as MRI image scans.

Figure 1:
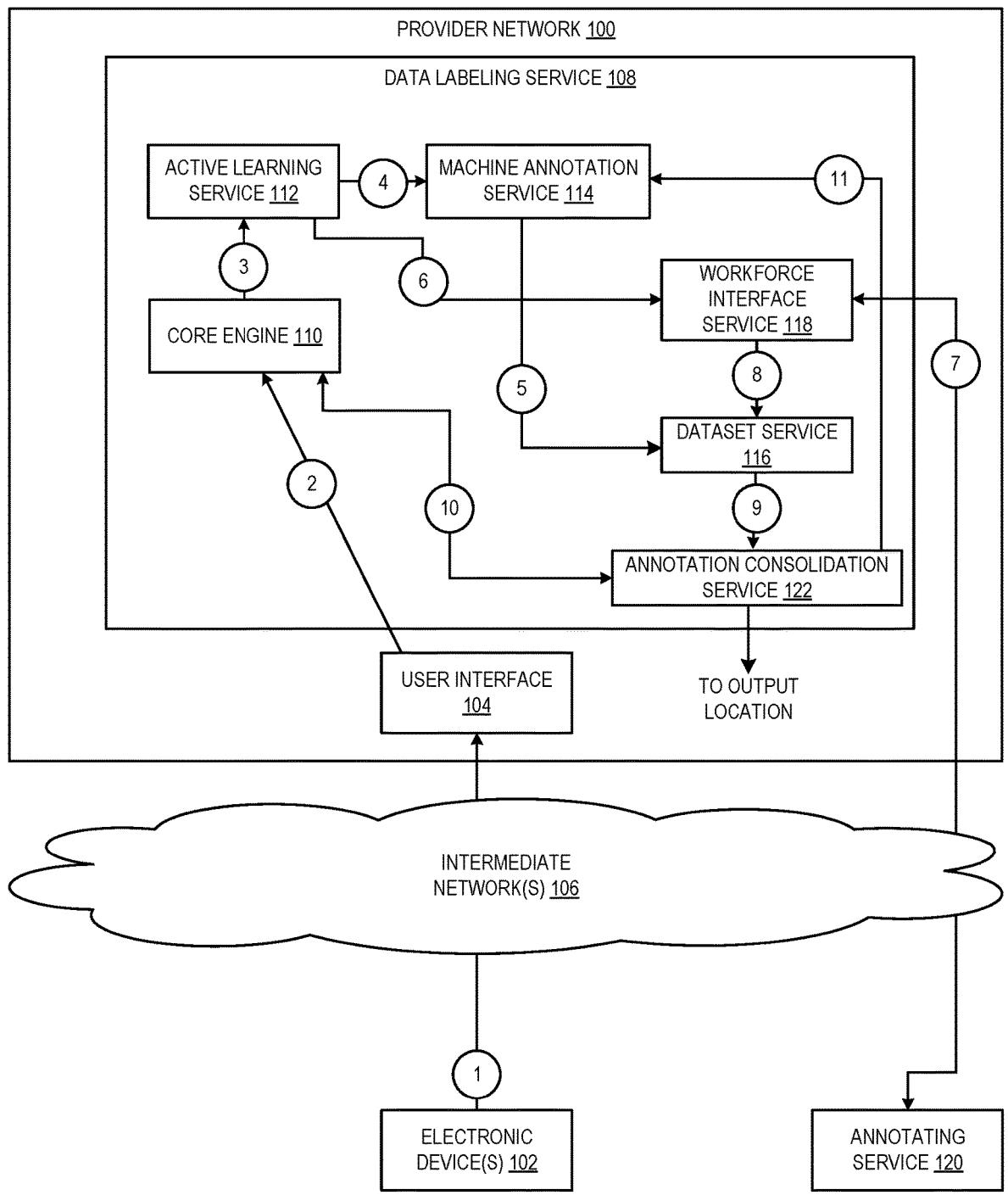
FIG. 1 is a diagram illustrating an environment for active learning-based data labeling according to some embodiments.

FIG. 1 is a diagram illustrating an environment for active learning-based data labeling according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internal via one or more interface(s) 104, such as through use of application programming interface (API) calls, via a console implemented as a website or application, etc. The interface(s) 104 may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As shown in FIG. 1, at numeral 1, a customer using electronic device 102 can provide access to a dataset through user interface 104. As discussed, the user interface 104 can be an API, console, or other interface. For example, the user interface 104 may be a front-end interface for data labeling service 108. Each dataset can be a collection of homogeneous pieces of data (such as image data, video data, comma separated values (CSV) files, etc.). A dataset may be a raw unlabeled dataset, a partially labeled dataset, a gold standard dataset, or a training dataset. As used herein, a gold standard dataset may refer to a dataset that has been verified as being accurately labeled. In some embodiments, the dataset may be stored in a customer-owned data store, such as an object store, database, or other data store. The customer can provide credentials to access the dataset (e.g., username and password, keys, etc.) and a location of the dataset (e.g., a Uniform Resource Locator (URL) of the dataset or another identifier of a storage location of the dataset). In some embodiments, at numeral 1, the customer may also specify one or more of a gold standard dataset, a target label space, a desired quality threshold, and an annotation budget.

Labels may be attributes of objects in a dataset. For example, labels may include a region including an object (e.g., a bounding box surrounding a particular object), the species of an animal in a picture, the words in an utterance, etc. Labels are the outputs of annotations after the annotations have been consolidated and have achieved a quality score above a given threshold. As such, as used herein, a label refers to the true underlying object property, while annotations refer to the tags or other outputs by a labeling task (e.g., by a human labeler or machine annotation).

The label space may be a sub-graph of the overall graph of predefined labels that can be used for annotations for specific dataset objects. For example, for a machine learning model to recognize species of birds, the label space includes labels (and associated label classes) for various species of birds. These labels can be either predefined (e.g., a closed label space) or incrementally defined by annotators (e.g., an open label space)

In some embodiments, the customer can specify a workflow to be used for labeling. The workflow may be provided by the active learning-based labeling service or may be a custom workflow specified by the user. Each workflow can be a nested workflow comprising a series of steps corresponding to one or more of active learning, machine annotating, manual annotating, annotation consolidation and quality score computation, model training, and then outputting of training datasets and/or models.

At numeral 2, the various properties described above that are received from the customer may be provided to the core engine 110. The core engine 110 drives the overall workflow definition, execution, monitoring, and orchestration behind the execution of multiple concurrent labeling workflows executed by the data labeling service 108. The core engine 110 is responsible for triggering/calling functions, activities and tasks on multiple different microservices as part of the overall execution of a workflow. The core engine may also maintain the state (in a multi-tenanted manner) related to the execution of workflows and associated annotation tasks for multiple customers.

At numeral 3, when the workflow is started, the dataset specified by the customer can be provided to active learning service 112 ("ALS"). ALS 112 may implement one or more active learning techniques as are known in the art. In some embodiments, the active learning technique used may depend on the type of data in the dataset (e.g., image data, audio data, video data, etc.). Additionally, the active learning techniques used may be specified by the customer in a custom workflow or may be built-in as part of data labeling service 108. The ALS 112 manages the selection of dataset objects that are to be auto-labeled and the selection of dataset objects that are to be manually labeled.

Active learning is a machine learning procedure that can be useful in reducing the amount of annotated data required to achieve a target performance. Active learning starts by incrementally training a model with a small, labeled dataset and then applying this model to the unlabeled data. For each unlabeled sample, ALS 112 estimates whether this sample includes information that has not been learned by the model. An example of an active learning technique is to train an object detection model that takes an image as input and outputs a set of bounding boxes. To train such an object detection model, the training and validation images of the detector are annotated with a bounding box per object and its category. Such a technique may start with a small training set of annotated images to train a baseline object detector. In order to improve the detector by training with more images, this technique continues to collect images to annotate. Rather than annotating all newly collected images, based on different characteristics of the current detector, the ALS 112 can select a subset of the images to be manually labeled. Once annotated, these selected images are added to the training set to incrementally train the object detection model. The entire process continues to collect more images, select a subset with respect to the object detector, annotate the selected ones with humans, incrementally train the detector and so on. Other data, such as video data, audio data, etc. may also be used in such a system.

ALS 112 can perform active learning for unlabeled or partially unlabeled datasets and use machine learning to evaluate unlabeled raw datasets and provide input into the data labeling process by identifying a subset of the input data to be labeled by manual labelers. In some embodiments, ALS 112 randomly selects a sample of the input dataset for labeling. In some embodiments, ALS 112 selects the subset of the dataset using uncertainty sampling. In this example, a model used by the ALS 112 preferentially selects examples for which the model produces a low confidence of identification. Other approaches may include representativeness-based sampling where the model selects a diverse set that represent the input dataset while limiting redundancy among the subset.

Once a subset of the input dataset is identified to be auto-labeled, the subset may be annotated. For example, in some embodiments, the subset may be sent to machine annotation service 114, as shown at numeral 4. Machine annotation service 114 may use an existing model that has been trained on the same or similar labelspace which is selected for the input dataset. These machine annotations may be output to a dataset service 116 at numeral 5. In some embodiments, dataset service 116 can communicate with WIS 118, machine annotation service 114, and core engine 110 to manage the flow of data to be labeled by data labeling service 108 and to manage the resulting labels for the data generated by data labeling service 108. Additionally, or alternatively, at numeral 6, the subset identified by the ALS 112 to be manually annotated can be sent to a workforce interface service 118 ("WIS"). The WIS 118 can interface with various manual annotators including crowdsource annotators, private (e.g., in-house) annotators, and/or annotating service providers (collectively annotating service 120). The type and/or variety of labelers may be selected by the customer when starting a new labeling workflow, as discussed above. WIS 118 can present the subset of the input dataset to the selected annotating service 120 at numeral 7. The subset may then be annotated by the selected annotators and the annotations may be returned to WIS 118. These annotations may be stored in dataset service 116 at numeral 8.

Once annotations have been received from the WIS 118 and optionally from machine annotation service 114, the annotations can be consolidated into labels by annotation consolidation service 122, as shown at numeral 9. Annotation consolidation may refer to the process of taking annotations from multiple annotators (e.g., humans and/or machines) and consolidating these together (e.g., using majority-consensus heuristics, removing bias or low-quality annotators, using probabilistic distribution that minimizes a risk function for observed, predicted and true labels, or other techniques). For example, based on each annotators' accuracy history, their annotations can be weighted. If one annotator has a 50% accurate history, their annotations may have a lower weight than another annotator with a 100% accurate history.

In some embodiments, the annotation consolidation service 122 can maintain a label score and a worker score when performing annotation consolidation. During consolidation, annotation consolidation service 122 can fetch current label scores for each piece of data in the dataset (e.g., image, video frame, audio utterance, etc.) and current worker scores for the annotator who provided the annotations on that piece of data. A new label score and worker scores can be computed for the piece of data based on previous state and currently received new annotation. The label score can be compared to a specified threshold. If the label score is higher than the threshold then no additional annotations are required. If the label score is lower than the threshold then the data may be passed to additional annotators to be further annotated by annotating service 120. At numeral 10, once the label score is higher than the threshold, then the core engine 110 can be updated to indicate that the subset of the input dataset has been labeled. The active learning loop may continue to execute with the core engine invoking the active learning service 112 to label a new subset of the input dataset that is still unlabeled or partially labeled. The annotation consolidation service can output the labeled subset of the input dataset to an output location, as discussed further below.

In some embodiments, the labeled subset of the input dataset can be used to train the active learning service model. As shown at numeral 11, the labeled subset of the input dataset can be provided to the machine annotation service 114. The machine annotation service 114 may include a training service that can generate a new model, or update the previously used model, using the labeled subset of the input dataset. In some embodiments, a separate training service (not shown) may obtain the labeled subset of the input dataset from the annotation consolidation service and may use the labeled subset of the input dataset to further train the model maintained by the machine annotation service 114. The above described process may then be repeated using the updated model. For example, if the updated model has converged, then the remainder of the input dataset can be accurately identified. If the updated model has not converged, then a new subset of the input dataset can be identified for further labeling according to the process described above. In some embodiments, the data labeling service 108 can output one or more of the converged model or the labeled dataset, as described further below.

In some embodiments, the data labeling service 108 may also output various performance metrics, such as performance against the annotation budget, quality score of annotated labels and performance against the defined quality threshold, logs and metrics in a monitoring dashboard, and/or an audit trail of annotations tasks as performed by annotators. The quality score can be a numerically computed value to measure the quality of consolidated labels. This score is compared to a desired quality threshold (which may be a default value or may be provided by the customer as an input) to determine whether consolidated labels have achieved the desired quality level and hence are considered trained labels. This quality score can be expressed as an output of a risk function on a probability distribution for real, true and predicted labels.

In various embodiments, a customer can provide an unlabeled dataset which they would like to label. They might also bring a pre-trained supervised machine learning model, as well as some data which has already been labeled in the past. These inputs are fed into the data labeling service. The first step of the service is to prepare for the main loop. The preparation produces a validation dataset, a first pre-trained machine learning model, and first estimates of the quality of every worker in the pool. Then the main loop runs, and produces the final model, as well as the fully labeled dataset, with labels for every object of the original unlabeled data, as well as final worker quality estimates.

Before starting the loop, the data labeling service can prepare data for it. The preparation step returns validation data, pretrained model, and worker quality estimate. First, a random subset of the unlabeled dataset is selected for validation and sent to human annotators. During all of the human annotation processes, worker quality is estimated. There are a few options for the start of the loop. If the customer brings a pre-trained model, it can be passed along to the main loop. If there is no pretrained model, but there is some prelabeled data, this data is used to train a default model for the selected modality. Even if the labels are not very reliable, prelabeled data can be used to train the model, as training can often be resilient to some noise in the data. It is not assumed that the prelabeled data is representative of the unlabeled dataset, and thus the data labeling service still constructs the validation set. Prelabeled data might have very reliable labels, in which case it can be identified as a Gold Standard dataset, representing true labels and which can be used to help estimate the quality of the human annotations, and individual worker accuracy.

The main loop starts by running inference with the model on the validation dataset. After that, every object is given a confidence level. For example, for image classification, a confidence level can be the probability that the model predicts for the most confident class. A threshold is found, such that for the objects whose model confidence is above the threshold, the expected quality of the label provided by the model exceeds a required quality value provided by the customer. Then, the inference on the unlabeled data is performed, and the threshold is applied on the resulting inferences. All objects with the confidence larger than the threshold get auto-annotated and put into the labeled dataset. For the rest of the objects, active learning is performed to identify a subset of the objects which potentially benefit the model most. Active learning may be executed in a separate active learning loop that iteratively labels portions of the unlabeled dataset and trains the model to better auto-label the dataset, as described herein. This batch of objects is sent for human annotation. During human annotation, previously-found worker quality parameters are used, and adjusted with the new information from their annotations of the new objects. Human labels for these objects are fed into the labeled dataset. All previously human-labeled objects are then used to train a new version of the supervised model, and the loop repeats until all the data is labeled. Then, the labeled dataset is returned to the customer, along with the last model which was trained.

Figure 2:
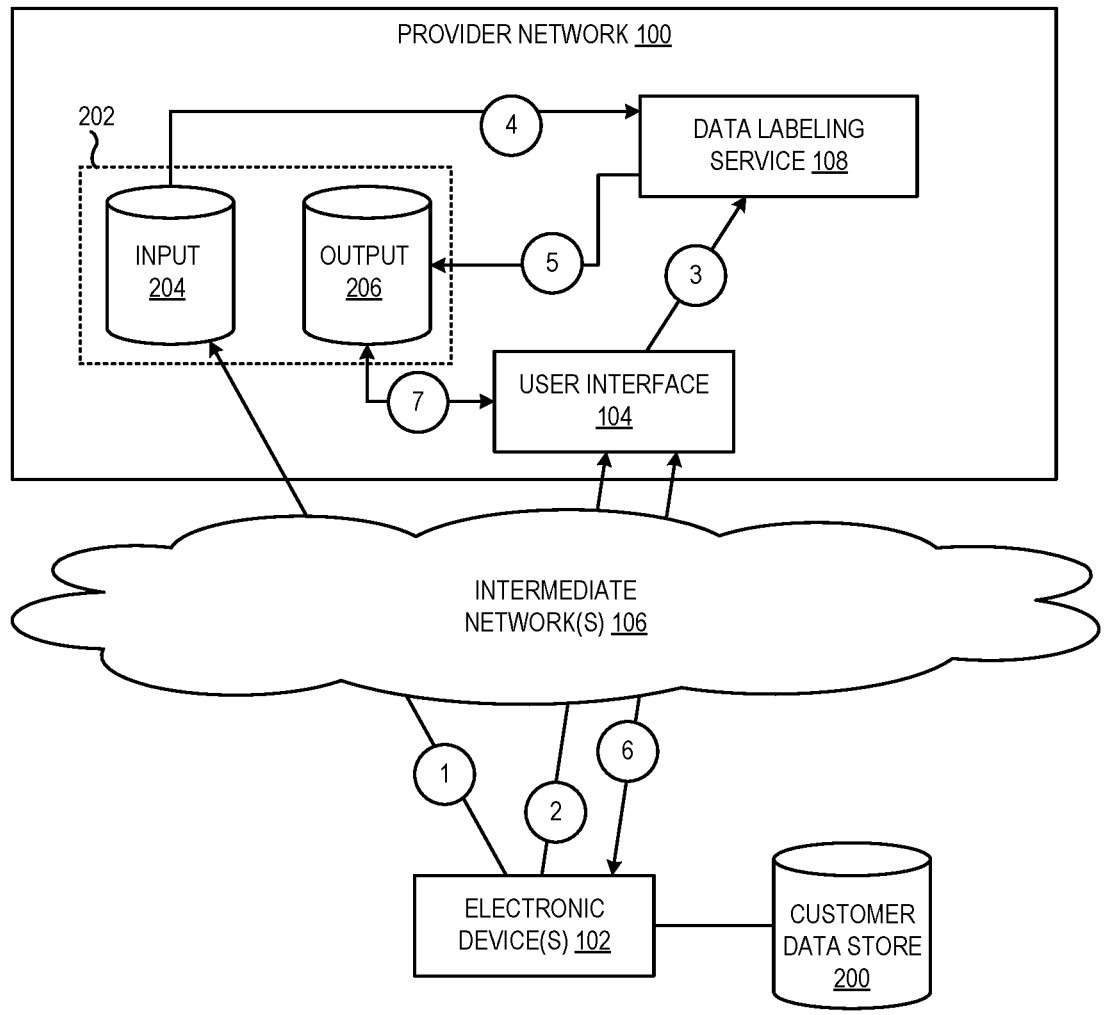
FIG. 2 is a diagram illustrating an environment for providing data sets to an active learning-based data labeling service and receiving outputs of the active learning-based data labeling service according to some embodiments.

FIG. 2 is a diagram illustrating an environment for providing datasets to an active learning-based data labeling service and receiving outputs of the active learning-based data labeling service according to some embodiments. As shown in FIG. 2, a customer can maintain their own customer data store 200 which includes one or more customer datasets. These may include unlabeled or partially labeled datasets to be provided to data labeling service 108. At numeral 1, the customer (via one or more electronic devices 102) can upload an input dataset to input data store 204. Input data store 204 and output data store 206 may be virtualized data stores 202 provided by a storage service in provider network 100. The storage service may provide object storage, block storage, database storage, or other virtualized storage services. At numeral 2, as discussed above, the customer can provide access information and/or credentials for the input dataset in input data store 204 through a user interface 104. This may include providing a URL for input data store 204 and credentials for accessing the data store. In some embodiments, the customer may establish permissions to allow the data labeling service 108 to access the input dataset. The user interface 104 can pass the information to data labeling service 108 at numeral 3.

At numeral 4, data labeling service 108 can retrieve the input dataset from the input data store 204 and perform active learning-based labeling, as discussed above with respect to FIG. 1. Data labeling service 108 can perform the above described workflow in nested fashion until the active learning model converges. The resulting labeled dataset and/or the converged model can then be output to output data store 206, at numeral 5. Both input and output data stores 204, 206 may be owned by the customer. Any intermediate state data generated for the input dataset by data labeling service 108 can be destroyed, with no durable copies of the labels or input dataset maintained by the data labeling service 108. Thus, the customer's data is labeled and ownership of the dataset and labels is retained by the customer. In some embodiments, the user can access the output data store 206 via user interface 104. For example, the user can send a request to view, download, transfer, etc. the labeled dataset in output data store 206 to user interface 104 at numeral 6. The user interface 104 can obtain the requested labeled dataset or portion thereof at numeral 7 and provide the requested labeled dataset to the user. In some embodiments, the user may access the output data store 206 through a separate user interface (e.g., provided by a storage service that is providing the output data store 206, a local file system, or other interface based on the implementation of the output data store).

In some embodiments, the dataset may include a manifest file which describes dataset properties and records. A record may include named attributes, including metadata such as image size, or labels such as "dog" or "cat". Other attributes may include raw data which needs labeling, such as image or sentences in natural language processing (NLP). In some embodiments, a manifest file for a dataset may be generated automatically by extracting metadata from files in the input data store 204 and generating the manifest file based on the metadata. In some embodiments, the output dataset stored in output data store 206 may be an updated version of the input dataset, which has been updated by combining the input dataset with the generated labels as a new dataset.

Figure 3:
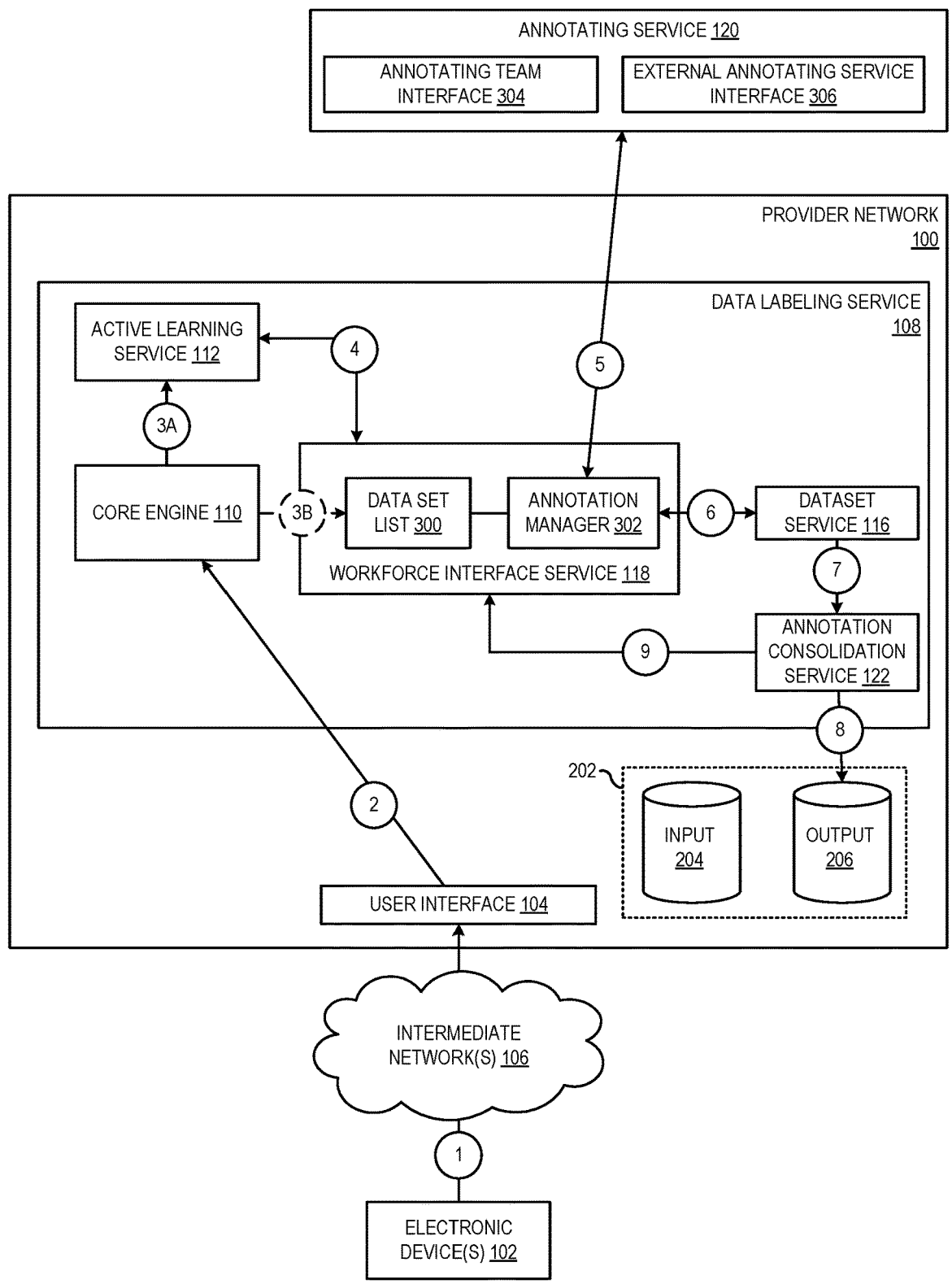
FIG. 3 is a diagram illustrating an environment for active learning-based data labeling using external workforces according to some embodiments.

FIG. 3 is a diagram illustrating an environment for active learning-based data labeling using external workforces according to some embodiments. As shown in FIG. 3, a customer can create a new labeling job at numeral 1 by sending job details (e.g., input dataset information, credentials, quality threshold, etc.) to user interface 104. At numeral 2, user interface 104 can submit the new labeling job to the core engine 110. In some embodiments, the new labeling job can be submitted to the core engine 110 when the customer submits a start workflow command to the user interface. As described above, the core engine 110 can orchestrate the workflow across various components of data labeling service 108. For example, at numeral 3A, the core engine 110 can provide the input dataset to active learning service 112. Active learning service 112, as described above, can determine a subset of the input dataset to be labeled, either manually or by a machine annotation service. Optionally, in some embodiments, the core engine 110 may provide all or a portion of the input dataset to the workforce interface service as shown at 3B. For example, the active learning service 112 can be bypassed on a first iteration of the active learning loop and a random sample of the input dataset can be provided to the workforce interface service 118 to be labeled. In subsequent iterations, all or a portion of the remaining unlabeled input dataset can be passed to the active learning service 112 to use active learning to increase the speed at which the input dataset is labeled.

At numeral 4, the active learning service 112 can pass the subset identified by the active learning service 112 to be manually annotated to WIS 118. As shown, WIS 118 may include a dataset list 300, which includes each object of the dataset (e.g., image file, text file, video file, video frame, audio utterance, etc.). For each object of the dataset, an annotation manager 302 can create a workflow for annotating service 120 to perform and pass the subset to the annotation service at numeral 5. Annotating service 120, as described above, may enable various workforces to perform annotation of the dataset. For example, annotating service 120 may include an annotating team interface 304, which provides the dataset for annotation to an internal team of annotators, and an external annotating service interface 306, which provides the dataset for annotation to an external annotation team or service such as a third-party annotation vendor. In various embodiments, the dataset may be encrypted prior to it being submitted to an annotation team or service, to protect the dataset while in transit.

The annotated datasets may be returned from the annotators to the annotation manager 302. The annotation manager 302 can output the annotated datasets to dataset service 116 at numeral 6. As discussed above, dataset service 116 can store annotated datasets received from manually annotators and auto-annotated datasets annotated by a machine annotator. At numeral 7, annotation consolidation service 122 can perform annotation consolidation on the annotated datasets. The annotation consolidation service 122 can determine a consolidated annotation (e.g., label) and quality score for each annotated object in the annotated datasets. If the annotation threshold has been reached, the annotation consolidation service 122 can store the resulting labels to output data store 206 at numeral 8.

If the threshold has not been reached, then at numeral 9, the annotation consolidation service can send a request to the annotation manager 302 to extend the annotation workflow execution. This may include requesting a configurable number of additional annotators annotate the dataset. The number of additional annotators may be determined based on the difference between the desired quality threshold and the current threshold. This may continue to loop (e.g., operations depicted as numerals 5-9) for each object of the dataset until all objects of the dataset have been annotated and determined to have a quality score higher than the threshold value.

FIG. 4 illustrates an example user interface 400 for customizing labeling workflows according to some embodiments. As shown in FIG. 4, a user can create a new custom labeling job via the user interface 400 by identifying a location of their input dataset, such as a URL or other reference to a location in a storage service as well as identifying a location to store the output of the labeling job. In some embodiments, the user can provide a role or other authentication data to access the input and/or output locations. The user, via user interface portion 402, can select a task type corresponding to the new custom labeling job, such as image classification, bounding box, semantic segmentation, text classification, or a custom annotation tool for the user's specific use case.

Figure 5:
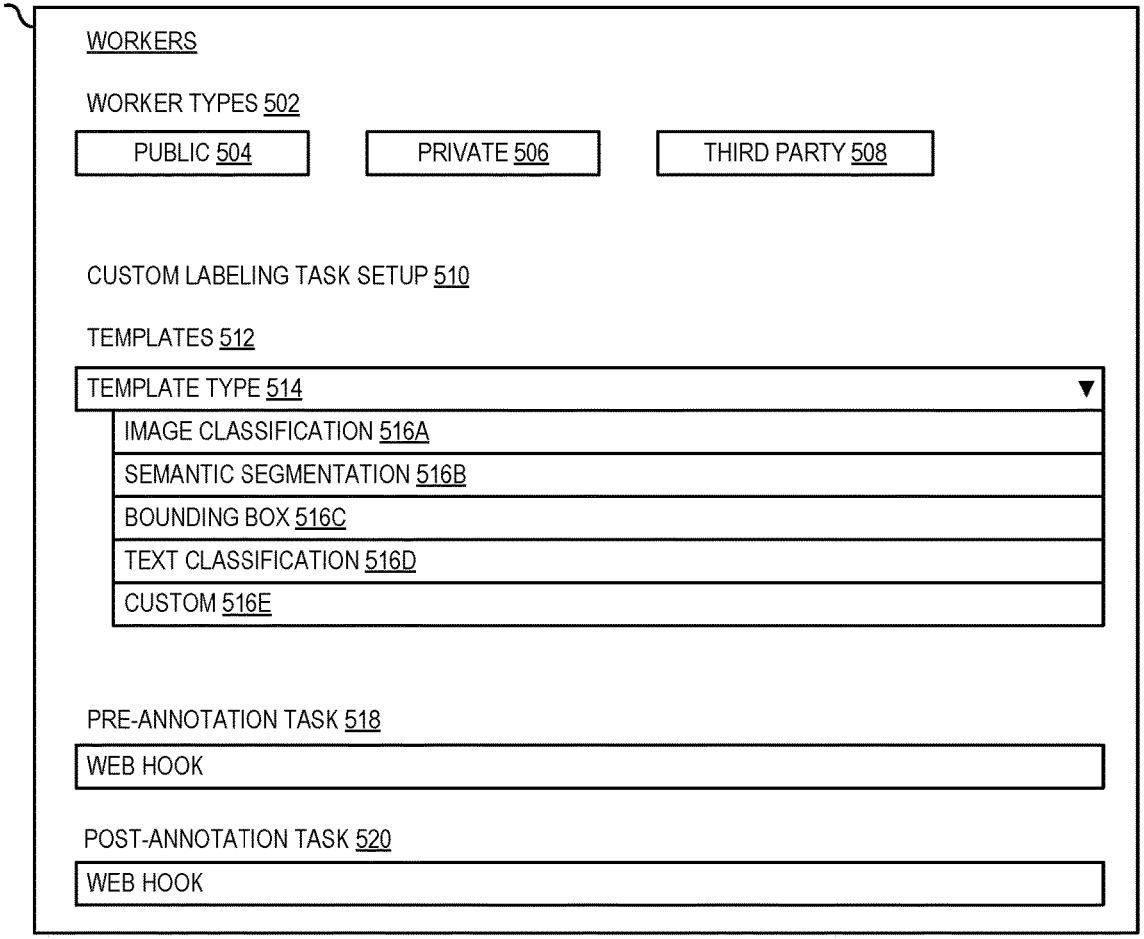
FIG. 5 illustrates an example user interface for customizing labeling workflows according to some embodiments.

FIG. 5 illustrates an example user interface for customizing labeling workflows according to some embodiments. As shown in FIG. 5, the user can utilize a user interface 500 to make a selection of workers to perform manual annotations. This may include selecting a type of the workers 502 to use for manually annotating the dataset, including a public workforce 504, private workforce 506, or third party 508 (e.g., vendor-managed) workforce. In some embodiments, the user can customize a predefined template 512 to create a custom labeling job. In various embodiments, different template types 514 may be provided to the user. Each template type may correspond to a different labeling task, such as image classification 516A, semantic segmentation 516B, bounding box 516C, or text classification 516D. In some embodiments, the user may define a custom template 516E for a type of labeling task specific to the user. The user can also add one or more serverless functions to be called before and/or after the execution of different steps of the labeling job. For example, a pre-labeling task 518 can call a specified serverless function or other web hook (e.g., a URL, URI, or other function associated with a web-based endpoint) before the labeling task starts and a post-labeling task 520 can call a different specified serverless function or other web hook (e.g., a URL, URI, or other function associated with a web-based endpoint) once the labeling task completes.

In various embodiments, a serverless function may include code provided by the user or other entity which can be executed on demand Serverless functions may be maintained within provider network 100 and may be associated with a particular user or account, or may be generally accessible to multiple users and/or multiple accounts. Each serverless function may be associated with a URL, URI, or other reference, which may be used to call the serverless function. Each serverless function may be executed by compute instances, such as virtual machines, containers, etc., when triggered or invoked by the active learning-based labeling job, or specific tasks within a given labeling job. In some embodiments, a serverless function can be invoked through an application programming interface ("API") call or a specially formatted hypertext transport protocol ("HTTP") packet. This enables users to define serverless functions that can be executed on demand, without requiring the user to maintain dedicated infrastructure to execute the serverless function. Instead, the serverless functions can be executed on demand using resources maintained by the provider network 100. These resources may be maintained in a "ready" state (e.g., having a pre-initialized runtime environment configured to execute the serverless functions), allowing the serverless functions to be executed in near real-time.

In various embodiments, the custom labeling jobs option enables users to create a labeling job for use cases that are not natively supported. For example, the user can create a custom labeling job to add hexagonal bounding boxes instead of rectangular bounding boxes, or label just points or lines in an image, or annotate domain specific data, such as MRI image scans.

Figure 6:
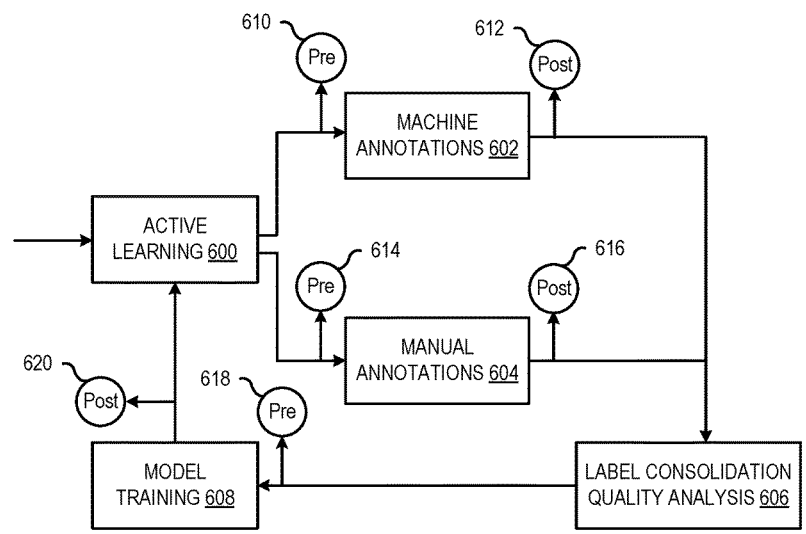
FIG. 6 is a diagram illustrating the customization of a labeling workflow according to some embodiments.

FIG. 6 is a diagram illustrating the customization of a labeling workflow according to some embodiments. As shown in FIG. 6, the labeling job can be divided into a number of steps, including active learning 600, machine annotations 602, manual annotations 604, label consolidation and quality analysis 606, and model training 608. Each step may be associated with a pre and/or post step function to be performed. In various embodiments, each pre and/or post function can be implemented as a web hook that is invoked when the associated step is reached in the labeling process. The web hook can be a reference associated with a severless function, or other web-based endpoint. In some embodiments, a pre-workflow function can be triggered before the start of an annotation workflow (e.g., prior to active learning step 600). This function can be used for selection/filtering of dataset objects that need to be annotated—for example, a developer can perform active learning here by using an incrementally trained model provided the inference job meets timing constraints. Input to this function can be a reference, such as a URL, for the input dataset manifest, and an annotation specification. The annotation specification can define which objects from the dataset are to be labeled (e.g., from one or more gold standard labels). For example, the annotation specification may define that the labeling job is to label all birds shown in an input image dataset, or to identify positive and/or negative sentiment in an input text corpus. Output from this function is list of dataset objects that are to be passed to active learning step 600 for annotation in a labeling job.

In some embodiments, a serverless function 614 can be triggered for each dataset object prior to sending it for annotation by manual annotators 604. It can be used for pre-processing (e.g., pre-filling of annotations, pre-annotating, adding annotations, etc.), and pre-processing of existing labels for a specific dataset object. Input to this function is the reference for the input dataset manifest and the specific entry for the corresponding dataset object in the manifest, and annotation specification. Output of this function may include an indication of whether this dataset is to be manually annotated or not, additional annotations that are added to the dataset, etc., depending on the pre-processing function that has been invoked.

In some embodiments, a post-annotation function 616 can be triggered each time the execution of an annotation task is completed and annotations for a specific dataset object are available. The input to this function can be annotation done by a worker, a reference for the input dataset manifest and specific entry for dataset object in the manifest, and annotation workflow specification. Output from this function can be whether more annotations are needed for this dataset object or a consolidated label. This function can be used for post-processing (e.g., annotation consolidation, post-filtering, quality analysis, validation on the labels, accuracy checks, etc.) or validation of annotations. Similar pre- and post-processing functions can be invoked prior or after machine annotations step 602, as shown at pre and post processing hooks 610 and 612.

Additional functions can be triggered before and after model training 618, 620. In some embodiments, these functions can include sampling or filtering of the dataset (e.g., to only process objects a particular class or other label) or other a preprocessing step. In some embodiments, the functions can perform pre-annotations, where additional data is added to the image before it goes to manual annotators. For example, the function may perform hypothesis generation of where a bounding box should be and have the workers confirm or deny the pre-label. This may be useful for very complex images, like birds in a forest, where it may be difficult for annotators to find all of the birds. Preprocessing using one of these functions can divide the image into 4/8/16/etc. pieces and tell the annotators only to look at one portion to simplify the annotations step. Such divide and conquer techniques can also be used in satellite imagery for labeling of buildings. In video processing, if there is no movement between one frame and another frame, every frame does not need to be labeled. As such, a preprocessing function can select only those frames with changes to be labeled. In some embodiments, post-annotation functions can be used to perform custom consolidation, validation (based on confidence scores), or augmentation (new labels based on the human annotations). In some embodiments, the pre and post model training functions 618, 620 can include data preparation. For example, label data may be transformed into a format that can be consumed by the model training technique 608 in use and another transformation to be used by active learning 600. In some embodiments, the data transformation can include data normalization. For example, in the image use case, machine learning models may require the images to be represented as tensors that have been normalized. The preprocessing function 618 can transform the image data into normalized tensors before training.

In some embodiments, the algorithms use by each step may also be pluggable. For example, the consolidation algorithm used in label consolidation and quality analysis 606 can be swapped out for something by the user that is specific to their custom domain or processing that they are performing. Similarly, the active learning algorithm to select which portions of an input dataset are to be manually labeled or auto-annotated which is used by active learning service 600 can be swapped out by the user.

Each function can be implemented using a pre-defined contract that defines the input and output and state (e.g., go to next step, error, etc.) for each function. Although the contract is prescriptive, the actual functionality implemented by the function is customizable according to user needs. For example, FIG. 7 illustrates example contracts according to some embodiments. As shown in FIG. 7, a request 702 and response 704 contract are shown. These contracts specify a format for requests and responses. The request can include a version, a labeling job identifier, and an object referencing the source data for the request. The response can include the task input, such as a data manifest which may be a JSON or other data object, and an indication as to whether manual annotation is to be performed.

In some embodiments, the request object 704 can similarly include a version and labeling job identifier, as well as label categories and attribute names. The request object may also include access credential information, such as a role, to be used to access the payload content to be labeled, which is referenced using a URI or other identifier. The payload content 706 can include an object identifier, one or more objects referenced by their source location, and annotation data associated with the source data. The response object 708 can include an identifier for the dataset and labels generated by consolidating the annotations received for the input objects to the labeling job.

FIG. 8 is a diagram illustrating example application programming interfaces (APIs) 800 for active learning-based data labeling according to some embodiments. As shown in FIG. 8, the example APIs 800 may include a CreateLabelingJob 802 command which may receive a dataset URL or other identifier, a dataset type (e.g., raw, partially labeled, gold standard, etc.), a quality threshold, and an annotation budget. The CreateLabelingJob command can cause a new labeling project to be created and coordinated by the core engine of the training dataset management service. The API 800 may further include a DescribeLabelingJob command 804 which may receive a customer ID and return projects associated with that customer ID. The projects may include currently pending projects and/or completed projects. The API 800 may further include a ListLabelingJobsForWorkTeam command 806 which may return all labeling jobs associated with a workteam identifier. In some embodiments, the API 800 may further include a ListLabelingJobs command 808 that may return objects representing current labeling jobs (e.g., pending labeling jobs). In some embodiments, the API 800 may further include a StopLabelingJob command 810 that may receive an identifier associated with a labeling job and stops execution of the labeling job. In some embodiments, the API 800 may also include a start labeling job command that may cause the core engine to start a labeling workflow for a given project.

In some embodiments, the API 800 may also include various other commands, such as a GetWorkflowOutput command, which can receive a worflow ID and return the output of the workflow including a training dataset and labels (e.g., the labeled input dataset for that workflow) or a trained model. The API 800 may also include a GetLabelsForDatasetObject command which receives an object ID and returns all labels associated with that object. For example, an image file ID (e.g., a file name or other identifier) may be received by this command and all labels for that image may be returned. Similarly, a GetDatasetObjectsforLabel command can receive a label and return a list of all objects in the dataset that are associated with that specific label.

Figure 9:
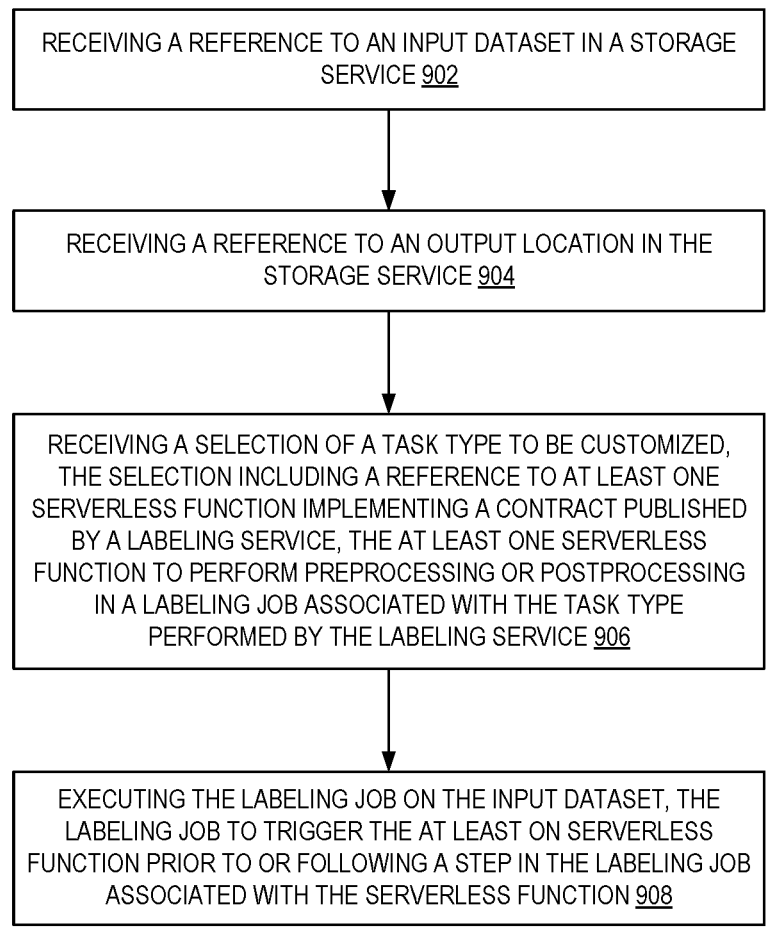
FIG. 9 is a flow diagram illustrating operations of a method for active learning-based data labeling according to some embodiments.

FIG. 9 is a flow diagram illustrating operations of a method 900 for active learning-based data labeling according to some embodiments. Some or all of the operations 900 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 900 are performed by data labeling service 108 of the other figures.

The operations 900 include, at block 902, receiving a reference to an input dataset in a storage service. The operations 900 include, at block 904, receiving a reference to an output location in the storage service.

The operations 900 include, at block 906, receiving a selection of a task type to be customized, the selection including a reference to at least one serverless function implementing a contract published by a labeling service, the at least one serverless function to perform preprocessing or postprocessing in a labeling job associated with the task type performed by the labeling service. In some embodiments, the contract defines an input format, an output format, and a state for the at least one serverless function. In some embodiments, the at least one serverless function to perform preprocessing receives the reference to the input dataset and filtering the input dataset and at least one filtering criteria. In some embodiments, the at least one serverless function to perform preprocessing is triggered for each object in the input dataset and wherein the at least one serverless function determines whether each object in the input dataset is to be annotated based on an annotation specification, the annotation specification defining what is being labeled in the input dataset.

In some embodiments, the input dataset is an image dataset, and wherein the at least one serverless function to perform preprocessing is triggered for each object in the input dataset and adds one or more pre-annotations to each object, the one or more annotations including one or more bounding boxes. In some embodiments, the at least one serverless function to perform preprocessing is triggered for each object in the input dataset and divides each object into a plurality of portions, each of the plurality of portions to be annotated by a separate worker.

The operations 900 include, at block 908, executing the labeling job on the input dataset, the labeling job to trigger the at least one serverless function prior to or following a step in the labeling job associated with the serverless function. In some embodiments, the labeling job includes performing at least one of image classification, bounding box, or text classification. In some embodiments, the at least one serverless function to perform postprocessing can receive a plurality of annotations provided by one or more annotation workers, a reference to an input dataset manifest, and the annotation specification and outputs a consolidated label based on the plurality of annotations.

In some embodiments, the input dataset is a video dataset including a plurality of video frames, and wherein the at least one serverless function to perform preprocessing identifies one or more of the plurality of frames that include at least one change relative to a previous frame, and provides the one or more of the plurality of frames as input to the labeling job.

In some embodiments, the operations include receiving a reference to an input image dataset in a storage service, receiving a reference to an output location in the storage service, receiving a selection of a task type to be customized, the selection including a reference to a first serverless function to perform preprocessing and a second serverless function to perform post processing, the first serverless function and the second serverless function each implementing a contract published by a labeling service, and executing the labeling job on the input dataset, the labeling job to trigger the first serverless function for each image in the input image dataset, the first serverless function to add one or more bounding boxes to each image before sending each image to a plurality of annotators, and the labeling job further to trigger the second serverless function for each image in the input image dataset after receiving annotations from the plurality of annotators, the second serverless function to consolidate the annotations to generate labels for each image.

Figure 10:
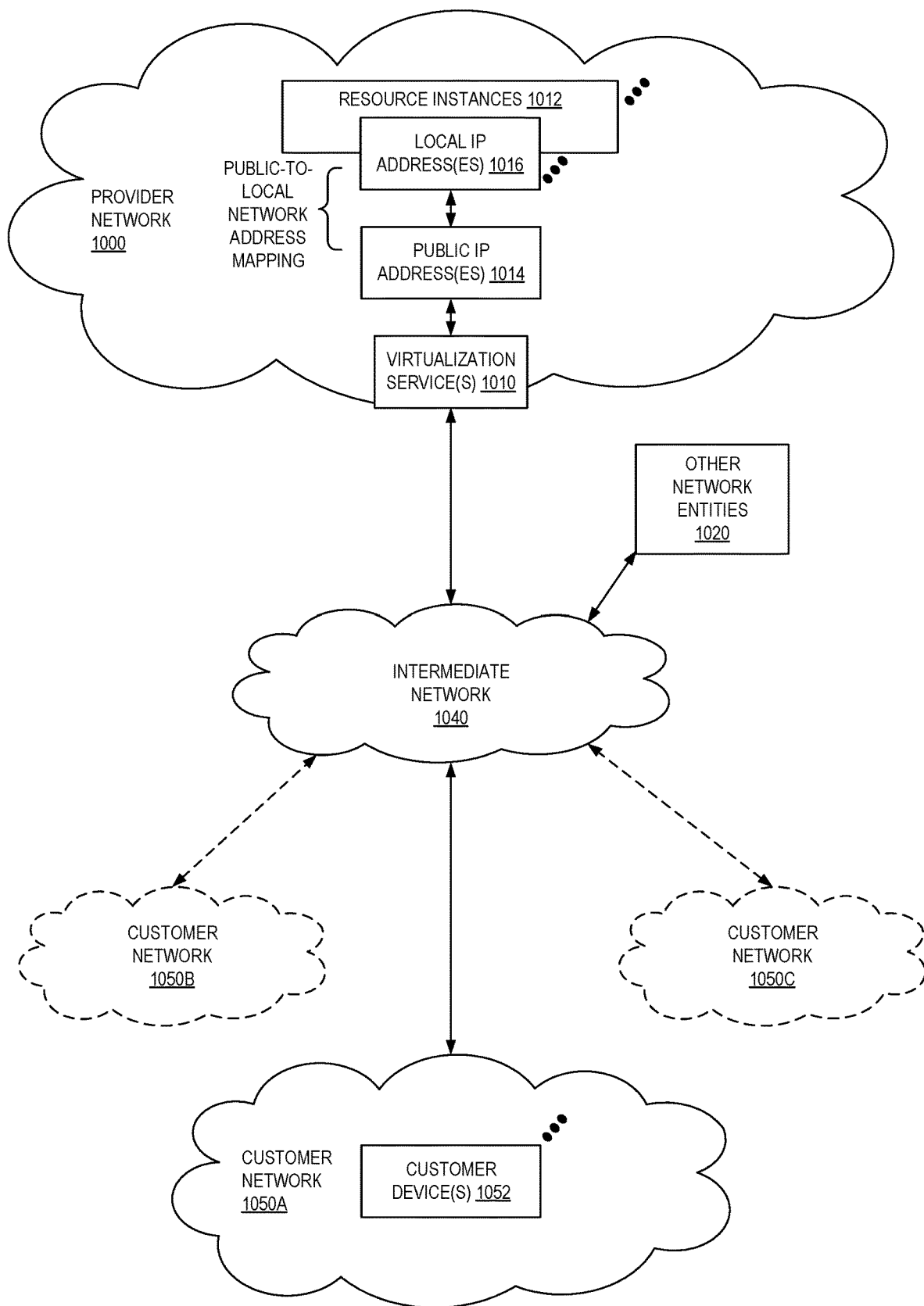
FIG. 10 illustrates an example provider network environment according to some embodiments.

FIG. 10 illustrates an example provider network (or "service provider system") environment according to some embodiments. A provider network 1000 may provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 may be associated with the resource instances 1012; the local IP addresses are the internal network addresses of the resource instances 1012 on the provider network 1000. In some embodiments, the provider network 1000 may also provide public IP addresses 1014 and/or public IP address ranges (e.g., Internet Protocol version 4 (IPv4) or Internet Protocol version 10 (IPv6) addresses) that customers may obtain from the provider 1000.

Conventionally, the provider network 1000, via the virtualization services 1010, may allow a customer of the service provider (e.g., a customer that operates one or more client networks 1050A-1050C including one or more customer device(s) 1052) to dynamically associate at least some public IP addresses 1014 assigned or allocated to the customer with particular resource instances 1012 assigned to the customer. The provider network 1000 may also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of customer network(s) 1050A-1050C may, for example, implement customer-specific applications and present the customer's applications on an intermediate network 1040, such as the Internet. Other network entities 1020 on the intermediate network 1040 may then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 may be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1000; a customer may then assign their allocated public IP addresses to particular resource instances allocated to the customer. These public IP addresses may be referred to as customer public IP addresses, or simply customer IP addresses. Instead of being assigned by the provider network 1000 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
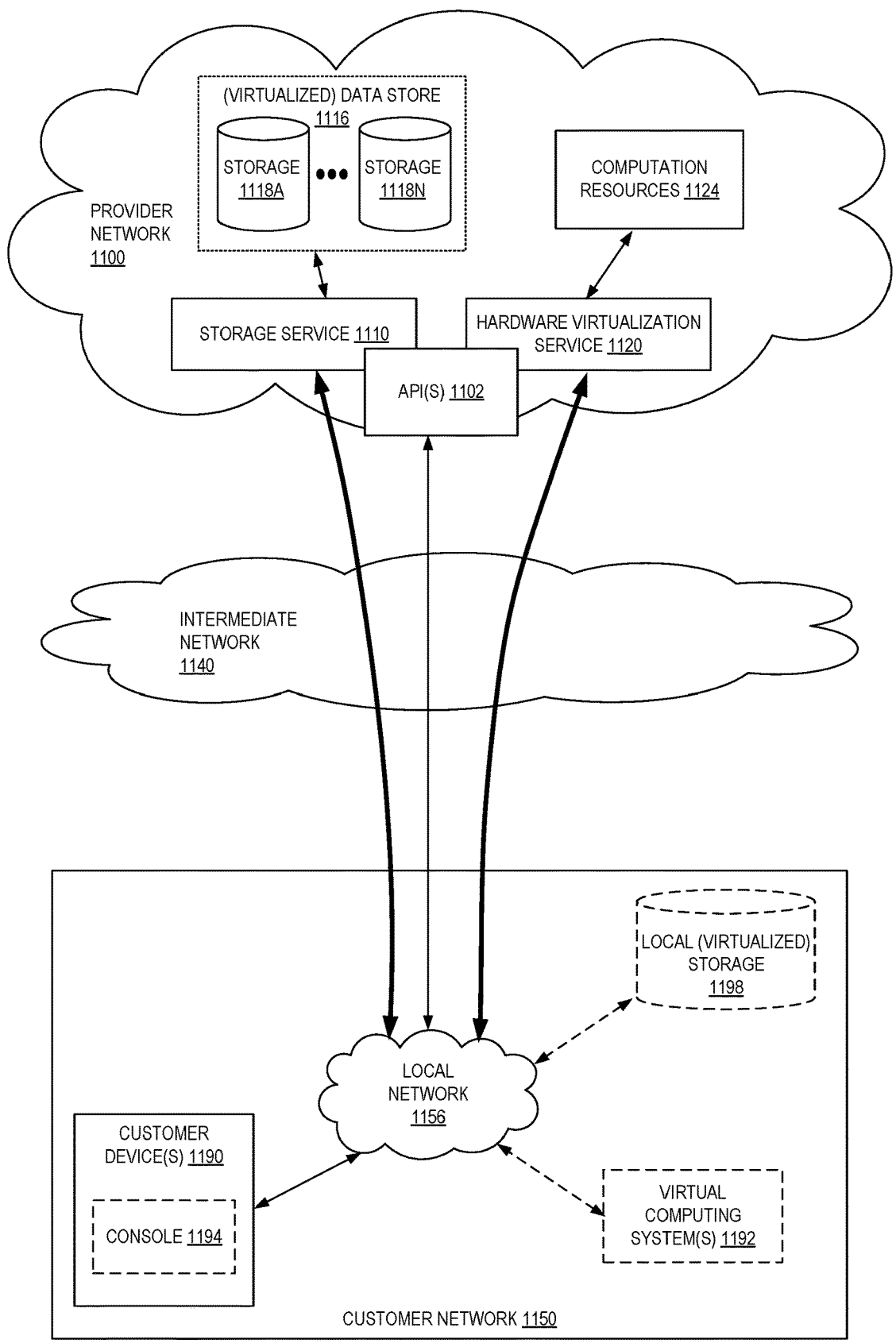
FIG. 11 is a block diagram of an example provider network that provides a storage service and a hardware virtualization service to customers according to some embodiments.

FIG. 11 is a block diagram of an example provider network that provides a storage service and a hardware virtualization service to customers, according to some embodiments. Hardware virtualization service 1120 provides multiple computation resources 1124 (e.g., VMs) to customers. The computation resources 1124 may, for example, be rented or leased to customers of the provider network 1100 (e.g., to a customer that implements customer network 1150). Each computation resource 1124 may be provided with one or more local IP addresses. Provider network 1100 may be configured to route packets from the local IP addresses of the computation resources 1124 to public Internet destinations, and from public Internet sources to the local IP addresses of computation resources 1124.

Provider network 1100 may provide a customer network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a customer network 1150 may access functionality provided by the hardware virtualization service 1120, for example via a console 1194 (e.g., a web-based application, standalone application, mobile application, etc.). In some embodiments, at the provider network 1100, each virtual computing system 1192 at customer network 1150 may correspond to a computation resource 1124 that is leased, rented, or otherwise provided to customer network 1150.

From an instance of a virtual computing system 1192 and/or another customer device 1190 (e.g., via console 1194), the customer may access the functionality of storage service 1110, for example via one or more APIs 1102, to access data from and store data to storage resources 1118A-1118N of a virtual data store 1116 (e.g., a folder or "bucket", a virtualized volume, a database, etc.) provided by the provider network 1100. In some embodiments, a virtualized data store gateway (not shown) may be provided at the customer network 1150 that may locally cache at least some data, for example frequently-accessed or critical data, and that may communicate with storage service 1110 via one or more communications channels to upload new or modified data from a local cache so that the primary store of data (virtualized data store 1116) is maintained. In some embodiments, a user, via a virtual computing system 1192 and/or on another customer device 1190, may mount and access virtual data store 1116 volumes via storage service 1110 acting as a storage virtualization service, and these volumes may appear to the user as local (virtualized) storage 1198.

While not shown in FIG. 11, the virtualization service(s) may also be accessed from resource instances within the provider network 1100 via API(s) 1102. For example, a customer, appliance service provider, or other entity may access a virtualization service from within a respective virtual network on the provider network 1100 via an API 1102 to request allocation of one or more resource instances within the virtual network or within another virtual network.

Illustrative System

Figure 12:
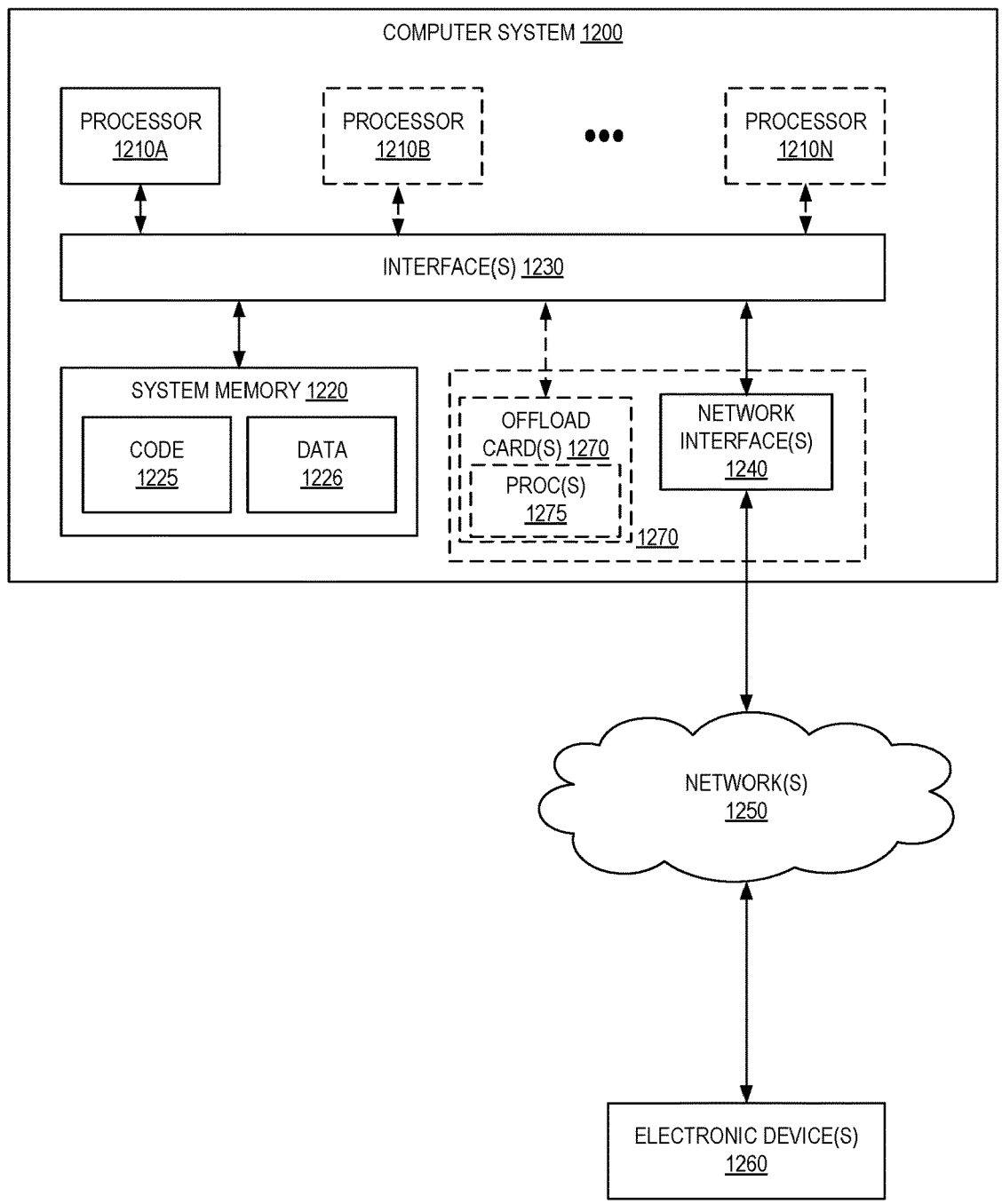
FIG. 12 is a block diagram illustrating an example computer system that may be used in some embodiments.

In some embodiments, a system that implements a portion or all of the techniques for active learning-based data labeling as described herein may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various embodiments a computer system 1200 may include one computing device or any number of computing devices configured to work together as a single computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1210 may commonly, but not necessarily, implement the same ISA.

System memory 1220 may store instructions and data accessible by processor(s) 1210. In various embodiments, system memory 1220 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1220 as code 1225 and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIG. 1, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1200 includes one or more offload cards 1270 (including one or more processors 1275, and possibly including the one or more network interfaces 1240) that are connected using an I/O interface 1230 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1200 may act as a host electronic device (e.g., operating as part of a hardware virtualization service) that hosts compute instances, and the one or more offload cards 1270 execute a virtualization manager that can manage compute instances that execute on the host electronic device. As an example, in some embodiments the offload card(s) 1270 can perform compute instance management operations such as pausing and/or un-pausing compute instances, launching and/or terminating compute instances, performing memory transfer/copying operations, etc. These management operations may, in some embodiments, be performed by the offload card(s) 1270 in coordination with a hypervisor (e.g., upon a request from a hypervisor) that is executed by the other processors 1210A-1210N of the computer system 1200. However, in some embodiments the virtualization manager implemented by the offload card(s) 1270 can accommodate requests from other entities (e.g., from compute instances themselves), and may not coordinate with (or service) any separate hypervisor.

In some embodiments, system memory 1220 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a reference to an input dataset in a storage service;
   receiving a reference to an output location in the storage service; and
   receiving a selection of a task type corresponding to a data labeling job, the data labeling job including the steps of:
      receiving a reference to a preprocessing web hook in the data labeling job corresponding to the task type;
      receiving a reference to a postprocessing web hook in the data labeling job corresponding to the task type;
      executing the data labeling job on the input dataset;
      while executing the data labeling job, triggering the preprocessing web hook prior to one of the steps in the data labeling job; and
      while executing the data labeling job, triggering the postprocessing web hook following the one of the steps in the data labeling job.

2. The computer-implemented method of claim 1, wherein the preprocessing web hook receives the reference to the input dataset and filters the input dataset using at least one filtering criteria.

3. The computer-implemented method of claim 1, wherein the preprocessing web hook is triggered for each object in the input dataset and wherein the preprocessing web hook determines whether each object in the input dataset is to be annotated based on an annotation specification, the annotation specification defining what is being labeled in the input dataset.

4. The computer-implemented method of claim 3, wherein the postprocessing web hook receives a plurality of annotations provided by one or more annotation workers, a reference to an input dataset manifest, and the annotation specification, and outputs a consolidated label based on the plurality of annotations.

5. The computer-implemented method of claim 4, wherein the input dataset is an image dataset, and wherein the preprocessing web hook is triggered for each object in the input dataset and adds one or more pre-annotations to each object, the one or more pre-annotations including one or more bounding boxes.

6. The computer-implemented method of claim 5, wherein the preprocessing web hook is triggered for each object in the input dataset and divides each object into a plurality of portions, each of the plurality of portions to be annotated by a separate worker.

7. The computer-implemented method of claim 1, wherein the input dataset is a video dataset including a plurality of video frames, and wherein the preprocessing web hook identifies one or more of the plurality of frames that include at least one change relative to a previous frame, and provides the one or more of the plurality of frames as input to the data labeling job.

8. The computer-implemented method of claim 1, wherein at least one of the preprocessing web hook or the postprocessing web hook implements a contract that defines an input format, an output format, and a state for the at least one web hook.

9. The computer-implemented method of claim 1, wherein the task type is one of image classification, bounding box, semantic segmentation, or text classification.

10. The computer-implemented method of claim 1, wherein the preprocessing web hook is reference to a first serverless function, and wherein the postprocessing web hook is reference to a second serverless function.

11. A system comprising:
   a storage service implemented by a first one or more electronic devices to store an input dataset; and
   a data labeling service implemented by a second one or more electronic devices, the data labeling service including instructions that upon execution cause the data labeling service to:
      receive a reference to the input dataset in the storage service;
      receive a reference to an output location in the storage service; and
      receive a selection of a task type corresponding to a data labeling job, the data labeling job including the steps of:
         receiving a reference to a preprocessing web hook in the data labeling job corresponding to the task type;
         receiving a reference to a postprocessing web hook in the data labeling job corresponding to the task type;
         executing the data labeling job on the input dataset;
         while executing the data labeling job, triggering the preprocessing web hook prior to one of the steps in the data labeling job; and
         while executing the data labeling job, triggering the postprocessing web hook following the one of the steps in the data labeling job.

12. The system of claim 11, wherein the preprocessing web hook receives the reference to the input dataset and filters the input dataset using at least one filtering criteria.

13. The system of claim 11, wherein the preprocessing web hook is triggered for each object in the input dataset and wherein the preprocessing web hook determines whether each object in the input dataset is to be annotated based on an annotation specification, the annotation specification defining what is being labeled in the input dataset.

14. The system of claim 13, wherein the postprocessing web hook receives a plurality of annotations provided by one or more annotation workers, a reference to an input dataset manifest, and the annotation specification, and outputs a consolidated label based on the plurality of annotations.

15. The system of claim 14, wherein the input dataset is an image dataset, and wherein the preprocessing web hook is triggered for each object in the input dataset and adds one or more pre-annotations to each object, the one or more pre-annotations including one or more bounding boxes.

16. The system of claim 15, wherein the preprocessing web hook is triggered for each object in the input dataset and divides each object into a plurality of portions, each of the plurality of portions to be annotated by a separate worker.

17. The system of claim 11, wherein the input dataset is a video dataset including a plurality of video frames, and wherein the preprocessing web hook identifies one or more of the plurality of frames that include at least one change relative to a previous frame, and provides the one or more of the plurality of frames as input to the data labeling job.

18. The system of claim 11, wherein at least one of the preprocessing web hook or the postprocessing web hook implements a contract that defines an input format, an output format, and a state for the at least one web hook.

19. The system of claim 11, wherein the preprocessing web hook is reference to a first serverless function, and wherein the postprocessing web hook is reference to a second serverless function.

20. The system of claim 11, wherein the task type is one of image classification, bounding box, semantic segmentation, or text classification.

* * * * *